(12) United States Patent
Dorneich et al.

(10) Patent No.: US 11,598,682 B2
(45) Date of Patent: Mar. 7, 2023

(54) SENSOR DEVICE AND METHOD FOR MONITORING A CLAMPING FORCE EXERTED BY A CLAMPING ELEMENT OF A CLAMPING DEVICE ON A COMPONENT

(71) Applicant: Balluff GmbH, Neuhausen a.d.F. (DE)

(72) Inventors: Albert Dorneich, Ostfildern (DE); Markus Fritton, Neuhausen (DE)

(73) Assignee: BALLUFF GMBH, Neuhausen ADF (DE)

( * ) Notice: Subject to any disclaimer, the term of this patent is extended or adjusted under 35 U.S.C. 154(b) by 199 days.

(21) Appl. No.: 17/160,605

(22) Filed: Jan. 28, 2021

(65) Prior Publication Data
US 2021/0278295 A1    Sep. 9, 2021

(30) Foreign Application Priority Data

Mar. 3, 2020  (DE) .......................... 102020105712.1

(51) Int. Cl.
*G01L 1/00* (2006.01)
*G01L 1/22* (2006.01)
*G01L 1/20* (2006.01)

(52) U.S. Cl.
CPC .............. *G01L 1/225* (2013.01); *G01L 1/205* (2013.01); *G01L 1/2206* (2013.01)

(58) Field of Classification Search
CPC ........ G01L 1/225; G01L 1/205; G01L 1/2206
See application file for complete search history.

(56) References Cited

U.S. PATENT DOCUMENTS

| | | | |
|---|---|---|---|
| 4,576,158 A * | 3/1986 | Boland | A61B 17/60 606/54 |
| 4,719,804 A * | 1/1988 | Maruyama | G01N 3/00 73/761 |
| 5,287,756 A * | 2/1994 | Tassic | G01L 5/101 73/862.471 |
| 2004/0116952 A1* | 6/2004 | Sakurai | A61B 17/1628 606/169 |
| 2018/0156024 A1* | 6/2018 | Coble | E21B 33/038 |
| 2020/0033202 A1* | 1/2020 | Stuker | G01L 1/04 |
| 2021/0045742 A1* | 2/2021 | Shelton, IV | A61B 90/06 |

* cited by examiner

*Primary Examiner* — Max H Noori
(74) *Attorney, Agent, or Firm* — GableGotwals

(57) ABSTRACT

A sensor device (16a-16d) is provided for monitoring a clamping force (F) exerted by a clamping element (11a-11d) of a clamping device (12a-12d) on a component (14), with at least one strain gauge (30a-30d), which can be arranged on a surface (90, 91) of the clamping element (11a-11d) of the clamping device (12a-12d) and is deformable under the clamping force (F), a transmission module unit (36) based on electromagnetic transmission technology connected to the at least one strain gauge (30a-30d) for detecting a voltage (U5) that is indicative of a deformation (f) of the at least one strain gauge (30a-30d), and an antenna element (38) connected to the transmission module unit (36) for transmitting a signal that is indicative of the detected voltage (U5), and for receiving electromagnetic energy for electrical supply of the transmission module unit (36) and at least one strain gauge (30a-30d).

14 Claims, 7 Drawing Sheets

SENSOR DEVICE AND METHOD FOR MONITORING A CLAMPING FORCE EXERTED BY A CLAMPING ELEMENT OF A CLAMPING DEVICE ON A COMPONENT

CROSS-REFERENCE TO RELATED APPLICATIONS

This United States application claims priority to German Patent Application No. 102020105712.1 filed 3 Mar. 2020, which is incorporated herein by reference.

The invention relates to a sensor device and a method for monitoring a clamping force exerted by a clamping element of a clamping device on a component, a computer program and a machine-readable storage medium.

PRIOR ART

It is known from practice that in modern machine tools, workpieces are fixed in the machining centre, for example in the field of plant and machinery construction on a rotatable machine table of the machine tool, so that the workpieces can be machined by turning, milling or the like. Hydraulic, pneumatic, electric or manual swing clamps are used for fixing the workpieces on the machine table. A swing clamp usually has a cylindrical body, on the end of which a swiveling clamp is fixed, which clamps by means of pressing a part of the workpiece on the machine table during a clamping process. The force applied by the clamp on the workpiece in a contact zone for clamping the clamp on the part of the workpiece is called the clamping force. For loading and unloading the machine, the arm of the swing clamp, and thus the clamp, swings to the side (thus away from the workpiece), to avoid collision of the arm with the workpiece. Alternatively a gripper may be used, the toe dog of which fixes the workpiece. Reference is made to a swing clamp hereinafter, without loss of generality.

During machining, if the workpiece is clamped incorrectly or with insufficient clamping force, the workpiece may be displaced from the tooling of the machine tool. This has a negative effect on the result of machining, and the workpiece and/or the tooling may be damaged on account of the high forces and speeds of the machine tool drive. Therefore, it is desirable to monitor the clamping force applied by the clamp on the workpiece during the operation.

It is also known that during operation, the workpiece is rotated on the machine table, which is rotatable about several axes, so that chips can drop down and/or the workpiece can be machined on all sides. Therefore, hydraulic or pneumatic lines for the swing clamp must be laid in such a way that these lines are not broken during table rotation. If a sensor for monitoring the clamping force is fitted on a cylinder base of the swing clamp, it is necessary for electrical lines for controlling the sensor and for transmitting the sensor data additionally to be laid in such a way that these lines also are not broken during table rotation.

A sensory clamping system for monitoring a process state was developed in the Special Research Field 653. Transfer Project T2, https://www.sfb653.uni-hannover.de/3763.html. A sensor for measuring the clamping force is fitted to the cylinder of the swing clamp and transfers measured data by means of a CAN interface to a CAN bus master, which in its turn is connected to an industrial PC. Electrical and hydraulic lines are moved between the sensor and the control system by means of a hybrid interface for rotating systems, which is provided in the rotary table.

The known clamping system has among other things the disadvantage that the lines on the cylinder of the swing clamp and on the rotary table must be led up to the lead-in. This manner of leading the lines takes up a lot of room and may also be fault-prone, as the lines could be damaged. Moreover, two types of lines are required, namely one for power supply and one for data transfer. This is also costly.

DISCLOSURE OF THE INVENTION

The object of the present invention is to provide accurate and reliable monitoring of a clamping force exerted by a clamping device on a component.

This object is solved by a sensor device and a method for monitoring a clamping force exerted by a clamping element of a clamping device on a component, a computer program and a machine-readable storage medium according to the independent claims. Advantageous embodiments are presented in the dependent claims.

According to a first aspect, a sensor device is provided for monitoring a clamping force exerted by a clamping element of a clamping device on a component, which has at least one strain gauge, which can be arranged on a surface of the clamping element of the clamping device and is deformable under the clamping force, a transmission module unit based on electromagnetic transmission technology, connected to the at least one strain gauge, for detecting a voltage that is indicative of the deformation of the at least one strain gauge, and an antenna element connected to the transmission module unit for transmitting a signal, which is indicative of the detected voltage, and for receiving electromagnetic energy for electrical supply of the transmission module unit and of the at least one strain gauge.

The sensor device according to the invention may have few components, namely one (or more) strain gauge(s), a transmission module unit and an antenna element. These components can all be arranged in an assembled state or integrated state on the clamping element. By pressing the clamping element on a surface of the component, for example a workpiece, a clamping force can be developed in the region of a contact of the clamping element and of the component. The clamping element may be a block-shaped, elongated element with a corresponding longitudinal axis. In its clamped state (i.e. if the clamping element can press on the workpiece), the clamping element may have a lower surface (bottom surface) and/or upper surface (top surface), which may be parallel to the workpiece and therefore perpendicular to the clamping force. Additionally or alternatively, one and/or two side surfaces of the clamping element, which may be oriented along the longitudinal axis, may in a clamped state be parallel to the clamping force.

The clamping force produced may lead to deformation, thus for example extension and/or contraction (especially of printed conductors) of the at least one strain gauge. Owing to the deformation of the at least one strain gauge, a voltage change may be produced, as a resistance of the at least one strain gauge may change. The voltage detected may in turn be used when monitoring the clamping force, in that for example the clamping force can be determined from the voltage qualitatively (i.e. whether the clamping force is or is not present, or increase or decrease thereof) or quantitatively (i.e. its magnitude).

As the sensor device can be arranged on the clamping element, monitoring of the clamping force at the movable element of the clamping device can take place, so that among other things a lifting motion of the clamping element and/or swiveling motion of the clamping element in the case of loosening of the component during a working process can be registered.

Owing to the arrangement of the transmission module unit, of the at least one strain gauge and of the antenna element on the clamping element, short cables can be used, so that monitoring of the clamping force can take place that is reliable and is not fault-prone, as the associated cables cannot be pulled off during rotation of a tool table.

Moreover, wireless data transmission and energy transmission can make the use of a slip ring in the machine table redundant. The transmission of the data and energy may moreover take place wirelessly by means of electromagnetic energy, so that no transmission errors can arise, as with cable-based signal transmission, which may arise especially with small analogue signals, over larger distances. Furthermore, the transmission standard used may make additional identification or tracking of the clamping element and/or workpiece possible, if an identification is transmitted by the transmission module unit. It is also possible for an additional measured quantity, measured on the clamping element, such as for example a temperature or values of acceleration, to be transmitted.

Moreover, precise monitoring of the applied clamping force can take place, because it is not the oil pressure of the swing clamp that is measured, as in known systems, but contraction or extension of the clamping element under the clamping pressure. In other words, direct measurement of the clamping force can be achieved as near as possible to the point where it arises, so that corrupted measurement of the clamping force on the cylinder at a distance from its occurrence can be avoided.

Moreover, the sensor device may be of battery-less design, so that the clamping device does not have to come to a stop during operation because the battery needs to be replaced. Therefore, the sensor device can operate particularly reliably, without interruptions.

Furthermore, owing to its simple design, the sensor device can be fitted or integrated well in clamping devices of any kind, for example manual, hydraulic, electric or pneumatic clamping devices.

Moreover, it is possible to retrofit this type of clamping force monitoring for a clamping device, as the sensor device can simply be applied on the clamping element. An ordinary, "passive" clamping element can be replaced with a "sensory" clamping element.

The components of the sensor device can be arranged in a common housing, so that internal (electrical) connections are protected. The components may in addition, through miniaturization, be produced on a single-part or multi-part printed-circuit board, so that connecting cables are not required.

The sensor device may in particular have just one strain gauge. In one embodiment, the sensor device may have at least two strain gauges (in particular exactly two strain gauges), which can be arranged on the surface of the clamping element and can be deformable under the clamping force. In both variants, simple, reliable and economical clamping force monitoring can be achieved with few components (especially without cables for energy and/or data transfer).

In one embodiment, the sensor device may have (in particular exactly) four strain gauges, which can be arranged on the surface of the clamping element and can be deformable under the clamping force, and the four strain gauges can be connected together electrically in such a way that the four strain gauges form a bridge circuit. This type of electrical connection may allow simple measurement of the change in resistance of the strain gauges and thus of the deformation of the surface of the clamping element under the clamping force, so that accurate and reliable determination of the clamping force can be achieved in a simple manner.

In one embodiment, the four strain gauges can be arranged on the surface of the clamping element in such a way that the surface is parallel to the clamping force, and two strain gauges of the four strain gauges can be arranged in such a way that printed conductors of the two strain gauges extend on a surface segment of the surface that becomes larger (for example is extensible) under the clamping force, and the other two strain gauges of the four strain gauges can be arranged in such a way that printed conductors of the other two strain gauges extend on a surface segment of the surface that becomes smaller (for example is contractible) under the clamping force. This measure may have the effect that extension of the strain gauge lies in a surface plane that is essentially parallel to the clamping force, which can be understood as a vector quantity. In other words, the printed conductors may be arranged on a side surface of the clamping element in the clamping state.

By arranging two strain gauges on one side of a neutral axis and arranging two strain gauges on the other side of the neutral axis, it is possible that the resistances of one pair of strain gauges increase and those of the other pair of strain gauges decrease. This may lead to a large signal strength of the bridge voltage, for measuring the clamping force.

In one embodiment, the printed conductors of the two strain gauges may be at an angle of $-45°$ to a line substantially perpendicular to the clamping force and the printed conductors of the other two strain gauges may be at an angle of $45°$ to a line substantially perpendicular to the clamping force. The angle may be reckoned anticlockwise in a top view of the strain gauge in its mounted state starting from the neutral axis. The neutral axis may be understood as the line substantially perpendicular to the clamping force. In the case of an elongated clamping element, the perpendicular line may extend parallel to a longitudinal axis of the clamping element. In this way, a change in the bridge voltage as a result of deformation of the surface of the clamping element can be maximum, so that the accuracy of voltage monitoring can be increased.

In an alternative embodiment, the four strain gauges can be arranged on the surface of the clamping element in such a way that the surface can point opposite the clamping force and extend perpendicularly to the clamping force and printed conductors of the four strain gauges extend along the surface and the printed conductors of two strain gauges in each case can be parallel to one another. Moreover, two strain gauges of the four strain gauges can be arranged in such a way that the printed conductors of the two strain gauges extend essentially parallel to a longitudinal axis of the (in particular elongated) clamping element. The other two strain gauges of the four strain gauges can be arranged in such a way that the printed conductors of the other two strain gauges extend substantially perpendicularly to the longitudinal axis of the clamping element. This measure may have the effect that the strain gauges face away from the clamping force (thus for example can be arranged on a top surface of the clamping element) and they may extend essentially in a plane perpendicular to the clamping force. The arrangement of the four strain gauges described may in a simple way produce a change in resistance of the printed conductors and therefore a bridge voltage of sufficient signal strength, as the resistances of the strain gauges that are oriented along the longitudinal direction and therefore along the deformation may change, whereas the resistances of the strain gauges that are substantially perpendicular to the longitudinal direction and therefore perpendicular to the deformation may remain almost equal. In particular, the surface may, under the clamping force, become smaller along the longitudinal axis and the surface substantially perpendicular to the longitudinal axis may become slightly larger under the clamping force.

In both variants of the arrangement of the strain gauges, the printed conductors may be the long, mutually parallel printed conductor segments of meander-shaped printed conductors.

With the two arrangements of the four strain gauges described, in particular on the assumption of a bridge circuit, temperature compensation may be achieved, so that a temperature-independent voltage is available as a measure for the clamping force.

In both arrangement variants, the strain gauges can be arranged on the surface in such a way that the strain gauges are glued on the surface with a positive fit.

In one embodiment, the sensor device may have an amplifier, which can be connected to the at least one strain gauge, especially to the at least two or the exactly four strain gauges, and the transmission module unit, and the amplifier can be configured to amplify a voltage produced by the deformation of the at least one strain gauge or the strain gauges and to output the amplified voltage to the transmission module unit. By amplifying the measured voltage, the signal produced can be suitably increased, which can be transmitted by means of the transmission module unit to the RFID write/read head device, which may in its turn increase the accuracy in voltage monitoring.

The transmission module unit may be configured for supplying the amplifier with electrical energy. Additionally or alternatively, the amplifier can also be arranged on the clamping element (in particular on the (for example multi-part) circuit board and/or in the housing).

In one embodiment, the transmission technology may be RFID (radio frequency identification) or a proprietary transmission technology. In other words, in the first option the transmission module unit may be configured as an RFID module unit. For example, commercial, standardized RFID technology according to standards ISO 15693 (13.56 megahertz) or EPC global (860-960 megahertz) can be used, which can make digital data transmission possible, to avoid wired analogue transmission errors.

In one embodiment, the clamping device may be configured as a swing clamp and the clamping element as a clamp. In an alternative embodiment, the clamping device may be configured as a gripper and the clamping element as a toe dog.

According to a second aspect, an assembly is provided for monitoring a clamping force exerted by a clamping element of a clamping device on a component, which has at least one sensor device according to the first aspect and a write/read head device based on electromagnetic transmission technology for receiving the signal from the antenna element of the sensor device and for transmitting electromagnetic energy to supply the sensor device.

An antenna of the write/read device may be separate from the control and evaluation electronics of the write/read head device or part thereof. The write/read head device may be coupled in communication with a cloud, a higher entity for control and/or data storage and/or a machine control system. The data stored in the cloud, in the higher entity and/or the machine control system may be usable for documentation, quality assurance and/or process improvement in machining of the component. The assembly may have several sensor devices, namely one sensor device per clamping device. As each sensor device represents an independent module, there may be any number of clamping elements used in the operation and the number is not limited. The assembly may also have several write/read head devices, which may be coupled to one or more or all sensor devices.

The write/read head device may use the same transmission technology as the transmission module unit. In the case of RFID, the write/read head device may be configured as an RFID write/read head device.

According to a third aspect, a method is provided for monitoring a clamping force exerted by a clamping element of a clamping device on a component, which has the steps of receiving electromagnetic energy for electrical supply of a transmission module unit based on electromagnetic transmission technology and at least one strain gauge by means of an antenna element connected to the transmission module unit, wherein the at least one strain gauge is arranged on a surface of the clamping element, detection of a voltage by the transmission module unit connected to the at least one strain gauge, wherein the voltage is indicative of deformation of the at least one strain gauge under the clamping force, and transmission of a signal, which is indicative of the detected voltage, by means of the antenna element. These method steps may take place in the sensor device according to the first aspect.

The transmitted signal can then be evaluated so that a conclusion about the clamping force can be made qualitatively from the voltage signal received, thus for example whether it is present, it decreases and/or increases. This evaluation can be performed by the control and evaluation electronics of a write/read head device. In this way, clamping force monitoring can be performed without further evaluation cost.

In one embodiment, the method may additionally have the steps of detecting a feed voltage applied on the at least one strain gauge and determining the clamping force from the feed voltage on the at least one strain gauge and the voltage that is indicative of the deformation. The first process step may take place in the sensor device and the second step may take place in the write/read head device. This measure may make quantitative determination of the clamping force possible, so that the clamping force can be known during the clamping force monitoring (as a numerical value).

In one embodiment, one or more measurement relationships between the voltage and the clamping force may be used in the determination. A measurement relationship may exist between the electrical voltage that is indicative of the deformation (A value for the electrical voltage that is indicative of the deformation can, for example, be determined as a ratio of the feed voltage and the detected voltage that is indicative of the deformation. Alternatively the value for the electrical voltage can be determined from a quantity derived from the detected voltage, for example, as a resistance ratio of the resistances of the strain gauges wired as a bridge circuit or as a change in the resistance ratio) and a deformation of the clamping element, and a further measurement relationship may exist between the deformation of the clamping element and the clamping force. It is also possible to use only a measurement relationship between the detected voltage that may be indicative of the deformation (A value for the electrical voltage that is indicative of the deformation can, for example, be determined as a resistance ratio of the resistances of the strain gauges wired as a bridge circuit or as a change in the resistance ratio) and the clamping force. Additionally, before the clamping force monitoring, calibrating measurements or calibrations may be carried out clamping force as a function of the geometry and/or elastic modulus of various clamping elements, which may define the respective measured relationship.

Alternatively or additionally, a mathematical relationship may exist between the voltage and the resistance change, between the resistance change or the change in resistance ratio and the deformation of the clamping element and/or the deformation of the clamping element and the clamping force.

According to a fourth aspect, a program is provided for data processing equipment, especially for the electronics of the sensor device according to the first aspect and/or the write/read head device, which is configured for carrying out steps of a method according to the third aspect, if it is carried out by the data processing equipment. The program may have instructions and form a control code, which comprises an algorithm for carrying out the method.

According to a fifth aspect, a machine-readable storage medium is provided, on which a program according to the fourth aspect is stored. The machine-readable storage medium may be configured for example as external storage, as internal storage, as a hard disk or as USB storage equipment.

BRIEF DESCRIPTION OF THE DRAWINGS

Embodiments of the invention are shown in the drawings and are explained in more detail in the following description. They show.

EMBODIMENTS OF THE INVENTION

Identical or similar components or elements are given the same reference symbol.

An assembly given the reference symbol 10 for monitoring a clamping force exerted on a workpiece 14 by an elongated, block-shaped clamping element 11a-11d of a clamping device 12a-12d has four identical sensors 16a-16d, which in each case are arranged on another of the clamping elements 11a-11d. In the embodiment, the clamping device 12a-12d is configured as a swing clamp and the clamping element 11a-11d is configured as a clamp. Alternatively, the clamping device 12a-12d may be configured as a gripper and the clamping element 11a-11d may be configured as a toe dog.

Figure 1:
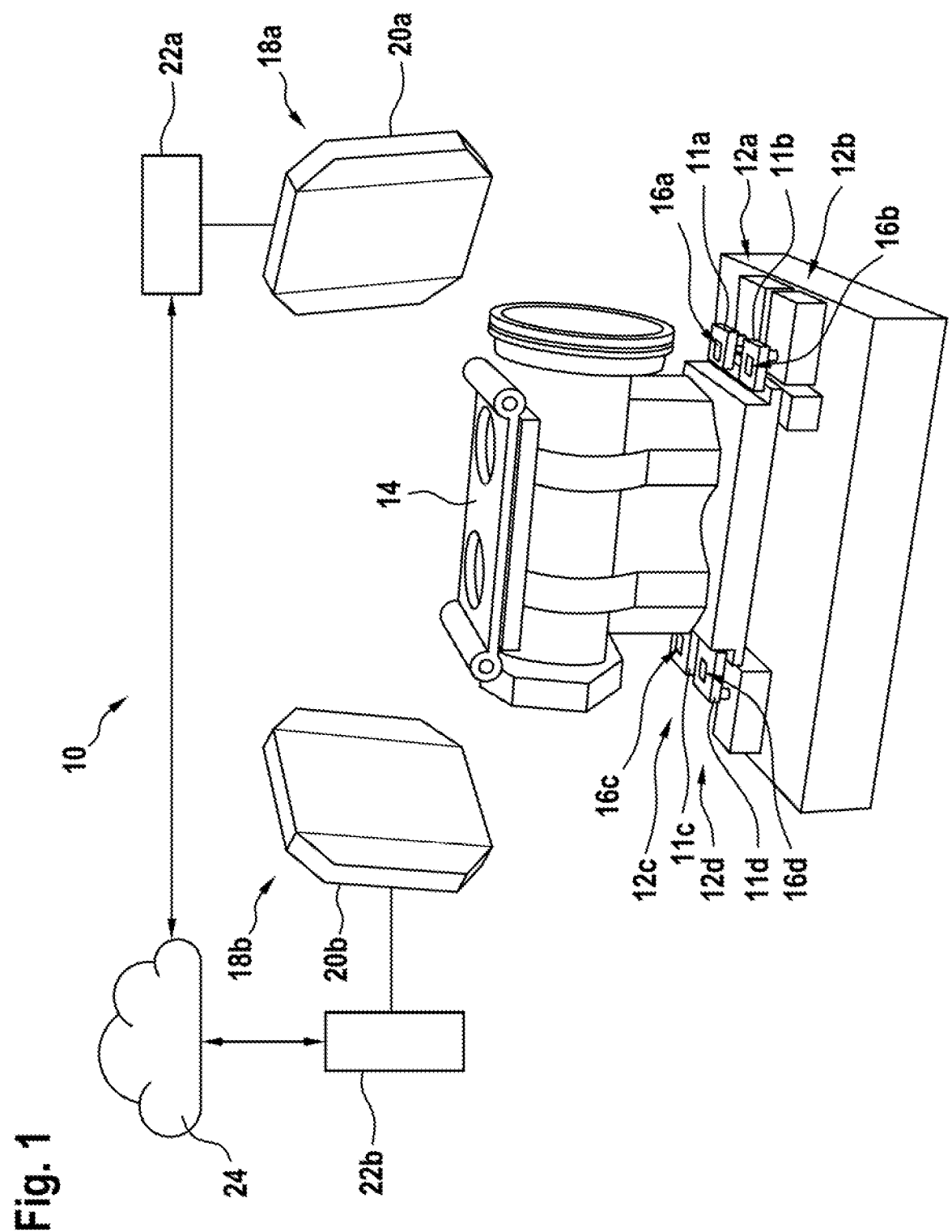
FIG. 1 an assembly according to one embodiment, which has four sensor devices for monitoring a clamping force exerted on a workpiece by a clamp of a swing clamp and two RFID write/read head devices.

The assembly 10 additionally has two write/read head devices 18a, 18b based on electromagnetic transmission technology in the form of RFID write/read head devices 18a, 18b, which in each case have an antenna 20a, 20b and an evaluation module 22a, 22b. Each of the antennas 20a, 20b is arranged in a line of sight to at least one of the sensor devices 16a-16d. In a mounted state shown in FIG. 1, the clamp 11a-11d of the respective swing clamp 12a-12d is configured for pressing on a surface of the workpiece 14 and exerting a clamping force on the workpiece 14.

Each RFID write/read head device 18a, 18b is connected in communication with a cloud 24, in which data of the RFID write/read head device 18a, 18b are stored and from which the RFID write/read head device 18a, 18b can receive control signals. Instead of the cloud 24, a higher control entity in the form of a computer connected to the Internet-of-Things (IoT) or a machine control system may be present.

The assembly 10 may also have only one RFID write/read head device 18a, 18b and/or some other number of sensor devices 16a-16d. The cloud 24 or the higher entity may also form part of the assembly 10.

Figure 2:
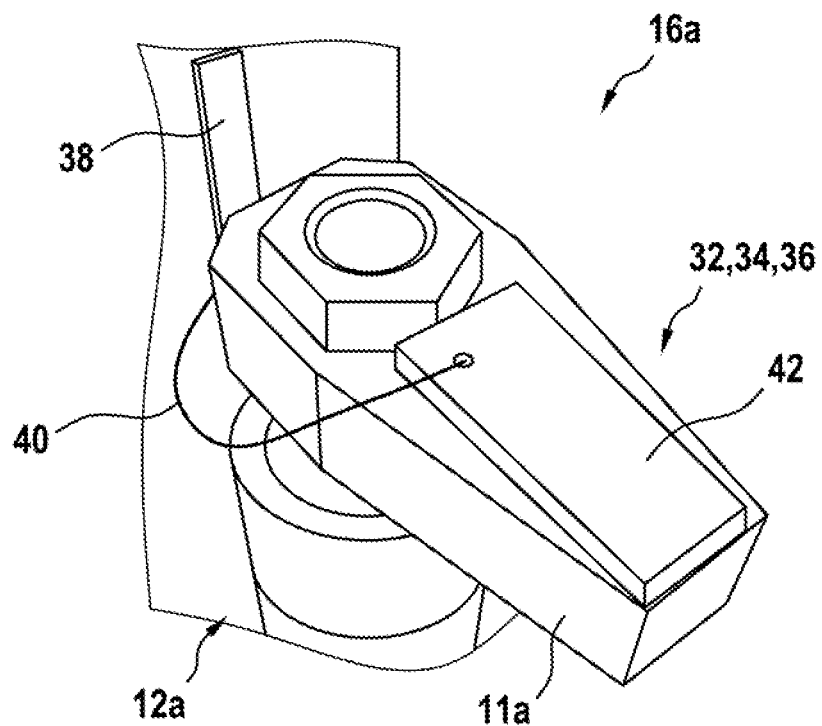
FIGS. 2 and 3 one of the sensor devices in FIG. 1 in perspective view respectively in schematic view.
Figure 3:
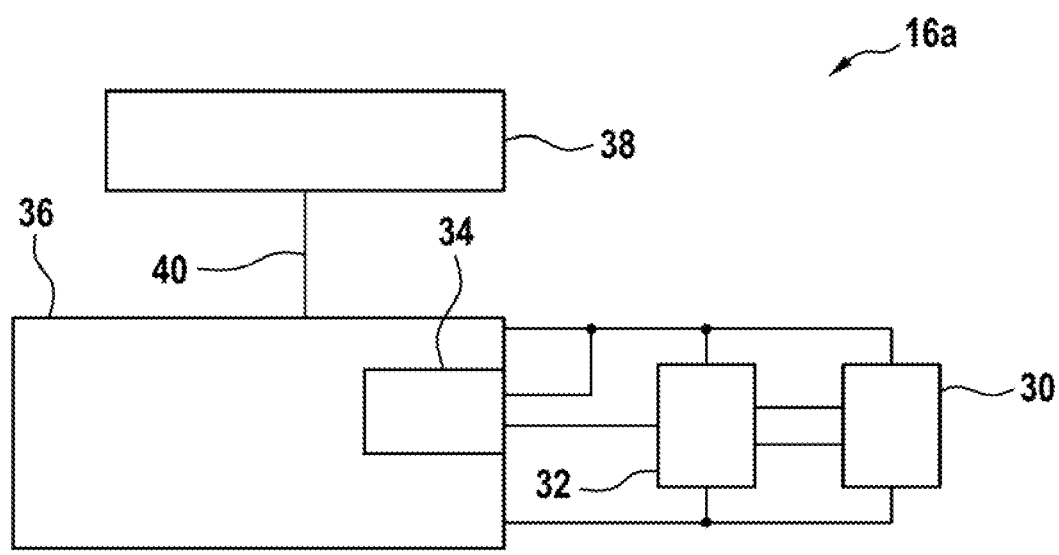

The sensor device 16a shown in more detail in FIGS. 2 and 3 has four strain gauges 30a-30d, which are connected electrically to an optional amplifier 32. The amplifier 32 is connected electrically to an analogue/digital converter 34 of a transmission module unit 36 based on electromagnetic transmission technology in the form of an RFID module unit 36, which is connected electrically to an antenna element 38 via a cable 40. The antenna element 38 is configured for transmitting a signal, which is indicative of a voltage measured by means of the strain gauges 30a-30d and is amplified by the amplifier 32, to the antenna 20a, 20b of the RFID write/read head device 18a. 18b by means of electromagnetic radiation. The antenna element 38 is further configured for receiving electromagnetic energy from the antenna 20a, 20b of the RFID write/read head device 18a, 18b, with which the RFID module unit 36, the amplifier 32 and the strain gauges 30a-30d can be supplied with electrical energy.

Instead of RFID, the write/read head device 18a, 18b and the transmission module unit 38 may employ a proprietary transmission technology.

As shown in FIG. 2, the amplifier 32, the analogue/digital converter 34 and the RFID module unit 36 are provided on a circuit board 42. The circuit board 42 may be of multi-part or single-part configuration. The components 32, 34, 36 may additionally be integrated in a housing in which the circuit board is mounted, and/or be encapsulated on the circuit board. In FIG. 2, the strain gauges 30a-30d are glued with a positive fit on the clamp 11a underneath the circuit board 42, and therefore hidden by the circuit board 42.

Figure 4:
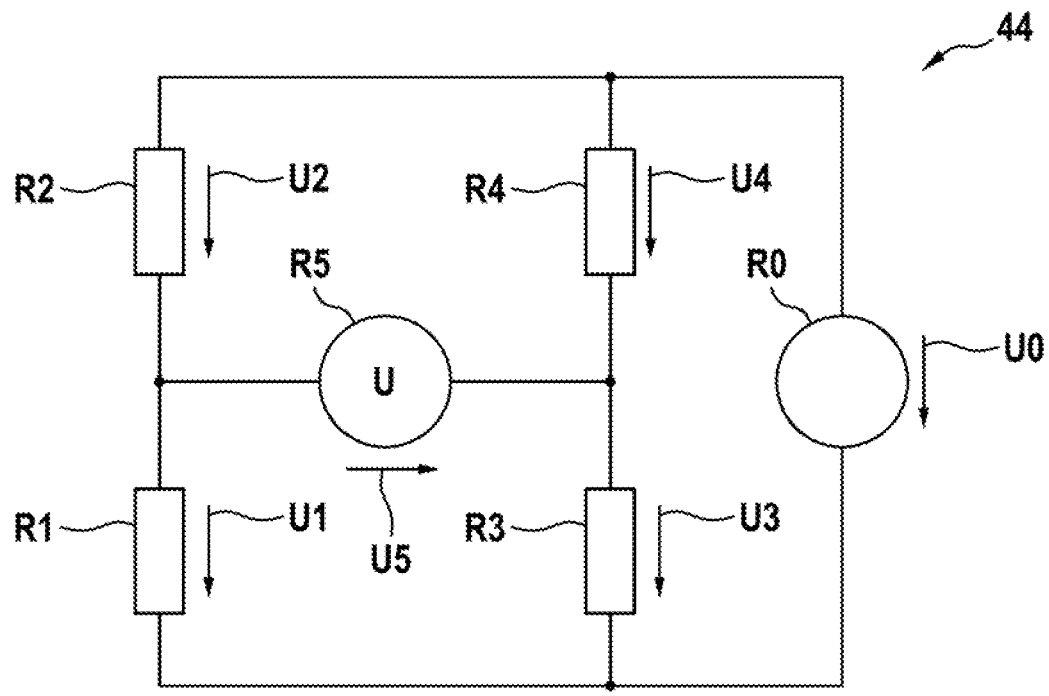
FIG. 4 a bridge circuit, which represents a metrological interconnection of four strain gauges of the sensor device in FIGS. 2 and 3.

As shown in FIG. 4, the four strain gauges 30a-30d form a bridge circuit 44, the resistances R1, R2, R3 or R4 of which are assigned to the strain gauges 30a, 30b, 30c or 30d respectively. A feed voltage applied to the strain gauges 30a-30d is designated U0, and a bridge voltage to be measured is designated U5. The voltage drop on the resistances R1, R2, R3 or R4 is designated U1, U2, U3 or U4. R5 designates an effective resistance of the bridge.

Figure 5:
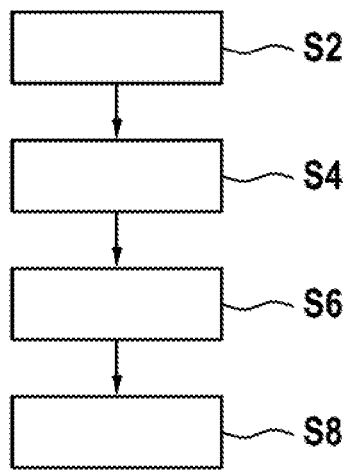
FIG. 5 a method for monitoring the clamping force exerted on the workpiece by the clamp of the swing clamp in FIG. 1 according to one embodiment.

For simplicity, operation of the assembly 10 is described hereunder only with reference to the sensor device 16a and the RFID write/read head device 18a. In the operation of the assembly 10, the clamp 11a rotates during a working process towards a surface of the workpiece 14 and presses on the latter. In a first process step S2 of a method shown in FIG. 5 according to one embodiment for monitoring the clamping force with which the clamp 11a presses on the surface of the workpiece 14, the antenna 20a of the RFID write/read head device 18a transmits electromagnetic energy to the antenna element 38 of the sensor device 16a, which receives the transmitted energy. The electromagnetic energy is rectified and conditioned by means of the RFID module unit 36, so that the DC voltage U0 is applied to the four strain gauges 30a-30d. Printed conductors of the strain gauges 30a-30d deform, as the surface of the clamp 11a deforms.

In a further process step S4, the bridge voltage U5 that is indicative of the deformation is converted and detected by means of the RFID module unit 36 and the analogue/digital converter 34 into a digital signal. Measurement of the voltage can take place after the voltage has been amplified by the amplifier 32.

In a process step S6 of the method, the detected, amplified and AD-converted voltage U5 is transferred by means of the antenna element 38 to the antenna 20a of the RFID write/read head device 18a, so that the evaluation unit 22a detects the bridge voltage U5. Optionally it is possible that in step S6, an identification of the sensor device 16a, for example a serial number, is transmitted to the RFID write/read head device 18a together with each measured voltage U5.

In a process step S8, the clamping force is monitored by the evaluation unit 22a. In a variant, this monitoring may, as shown in FIG. 6, be accomplished by analysing the measured bridge voltage U5 qualitatively as a function of time, as a measure for the clamping force.

Figure 6:
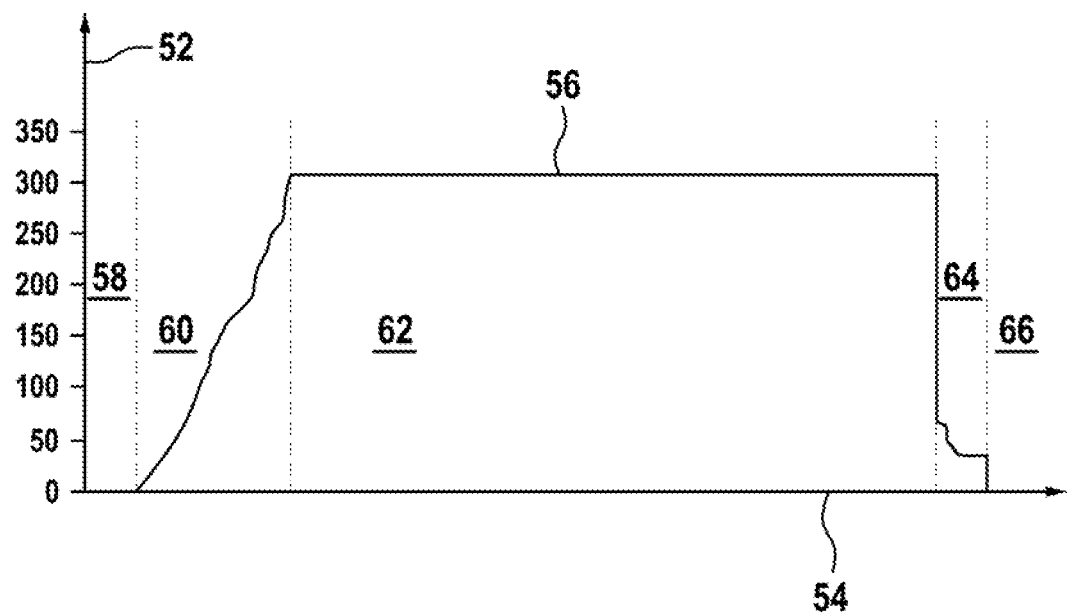
FIG. 6 a bridge voltage detected by the method in FIG. 5.

In the diagram shown in FIG. 6, the measured bridge voltage U5 (y-axis 52 in units of millivolt) is plotted as a function of time (x-axis 54 in units of seconds). A curve 56, which corresponds to the bridge voltage U5, is zero in an unclamped state 58 of the swing clamp 12a. During this time, the clamp 11a can be swiveled towards the workpiece 14. In a clamping state 60 of the swing clamp 12a, the bridge voltage U5 increases almost linearly, as the clamp 11a presses more and more strongly on the workpiece 14. During a machining period 62 of the workpiece 14, the voltage U5 is constant in a fully clamped state of the swing clamp 12a. The bridge voltage U5 decreases in an unclamping period 64, during which the clamp 11a is released from the workpiece 14, until it is equal to zero in an unclamped state 66. In the unclamped state 66, the clamp 11a can be swiveled away from the workpiece 14 again.

Figure 7:
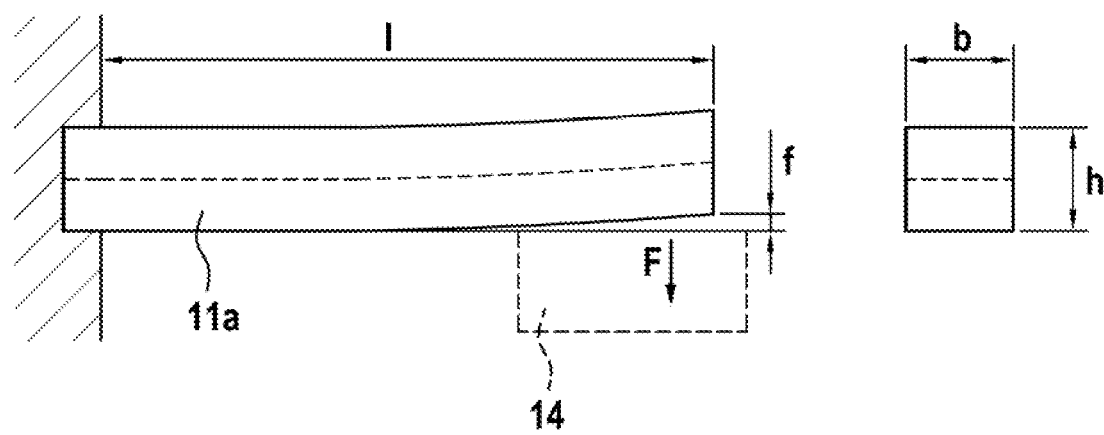
FIG. 7 a beam clamped on one side and deformed under a clamping force.

In a further variant of the method, the direct current voltage U0 can be detected in addition to the bridge voltage U5 in step S4. In process step S6, the voltage pairs U0, U5 and optionally the identification of the sensor device 16a are transmitted to the antenna 20a. In step S8, the clamping force exerted on the workpiece 14 is monitored by determining the clamping force from the measured voltage U0 and the measured bridge voltage U5. For this, for example a mathematical relationship between the measured voltages U0, U5 and the resistance ratio given by the resistances R1-R4 according to $$U5 = U1 - U3 = U0\left(\frac{R1}{R1+R2} - \frac{R3}{R3+R4}\right) = U0\frac{R1R4 - R3R4}{(R1+R2)(R3+R4)}$$

is used in the evaluation unit 22a. From the temporal change in resistance of the resistance ratio $$d\left(\frac{R1R4 - R3R4}{(R1+R2)(R3+R4)}\right)$$

determined, it is possible, taking into account a calibration carried out beforehand, in which known deformations f are assigned to known changes of the resistance ratio, to draw a conclusion about the deformation f of the clamp 11a. The clamping force F can be derived, taking into account the relation $$f = \frac{F * l^3}{\frac{b * h^3}{12} * 3 * E}$$

from the deformation f. In the above, l, b and h denote, as shown in FIG. 7, the length, the width and the height of the clamp 11a approximated as a beam. E denotes the elastic modulus. A direction of the clamping force F is indicated by the arrow and points to the workpiece 14.

Instead of the mathematical relationship between the resistance ratio and the voltages U0, U5, the calibration and the mathematical relationship between the deformation f and the clamping force F, it is also possible that a measurement relationship exists between U0, U5 and the clamping force F. For this, a calibration of the voltages U0, U5, or optionally of their ratio U5/U0, is carried out for different known clamping forces F, so that a conclusion about the clamping force F can be made from the measured voltages U0, U5 or U5/U0 using the calibration.

Figure 8:
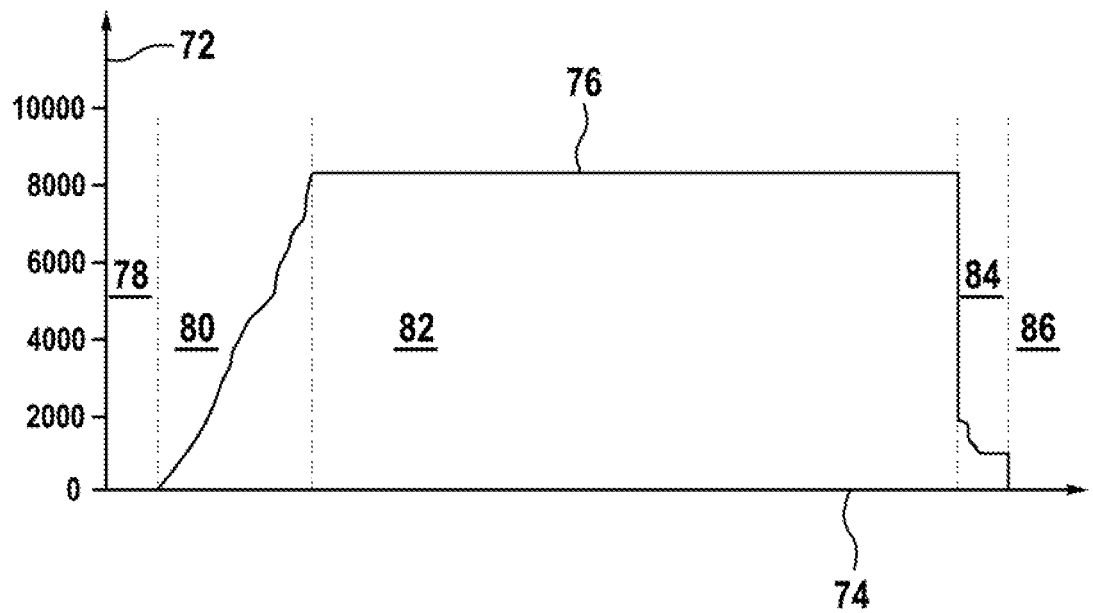
FIG. 8 a clamping force detected by the method in FIG. 5.

FIG. 8 shows the clamping force F (y-axis 72 in units of newtons) determined as a function of a measuring time (x-axis 74 in units of seconds). The clamping force F is represented by the curve 76. The clamping force F is equal to zero in an unclamped state 78 and increases linearly in a clamping state 80 up to a maximum of about 8000 newton. In a clamped state 82, the clamping force F is constant and decreases to zero in an unclamping state 84, where it remains in the unclamped state 86.

In both variants of the method, steps S2-S6 or S2-S8 may be repeated periodically, so that the bridge voltage U5 and optionally U0 are detected in periodic intervals continuously throughout the operation.

Figure 9:
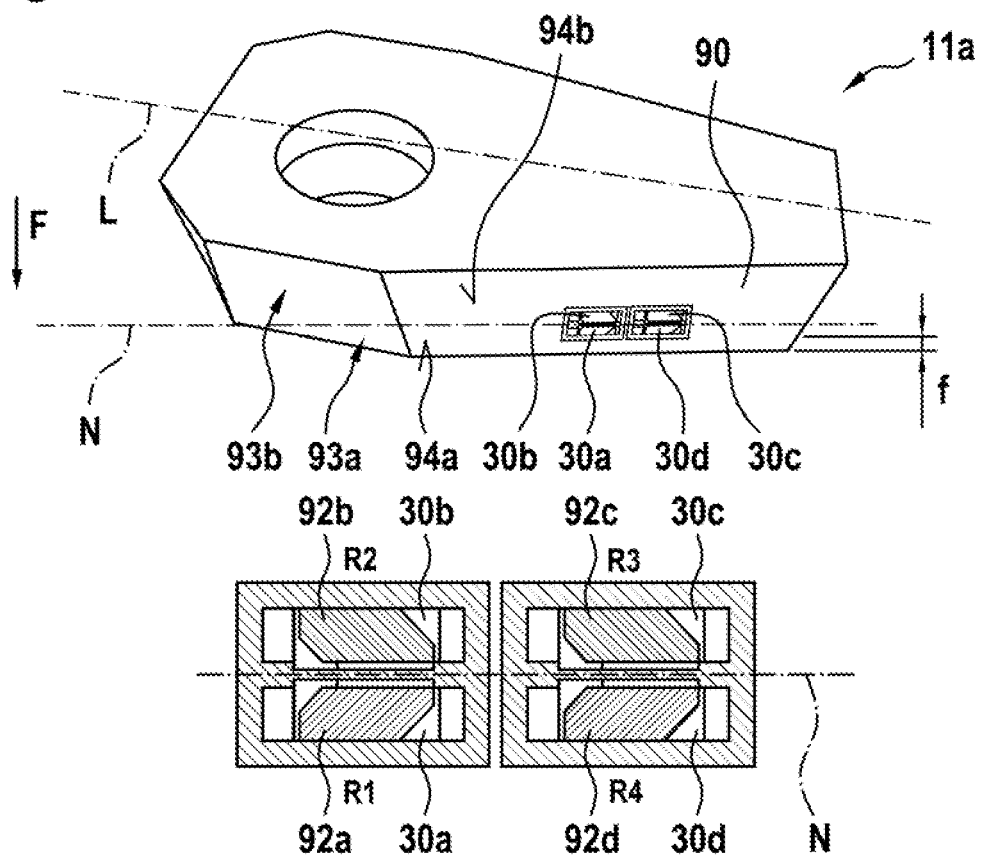
FIG. 9 an assembly of the four strain gauges on the clamp in FIG. 2.
Figure 10:
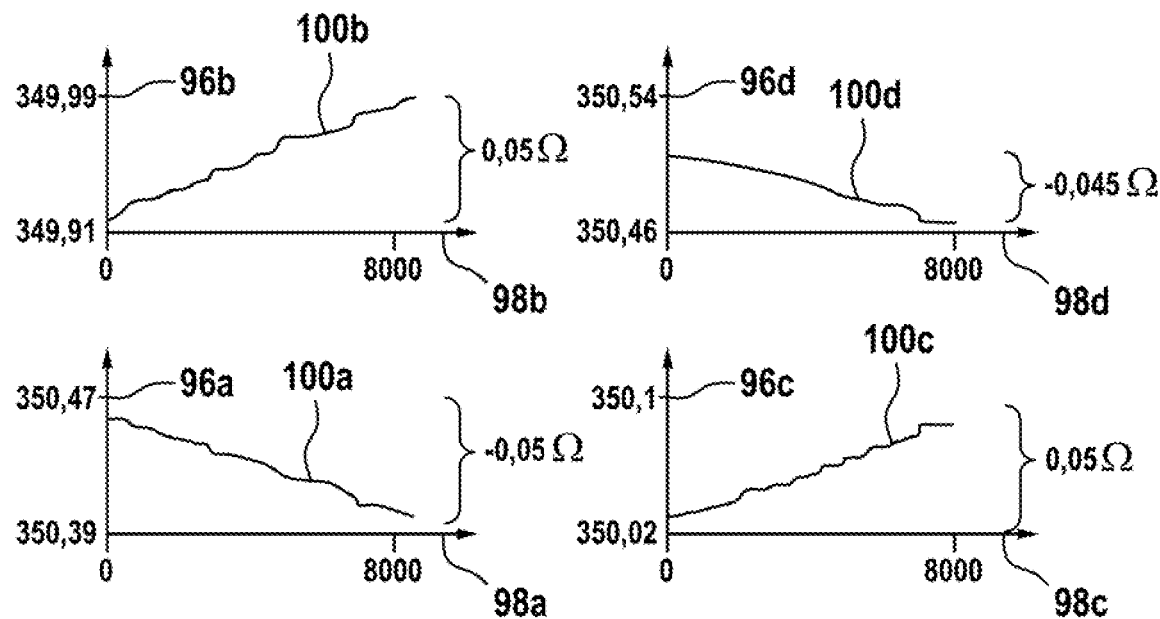
FIG. 10 schematic diagrams that show the resistances of the strain gauges in FIG. 9 varying under the clamping force.

FIG. 9 shows an arrangement of the four strain gauges 30a-30d on the clamp 11a, which are fitted along a neutral axis N on a side surface 90 of the clamp 11a. Fitting may for example take place by means of positive-fit bonding at an elevated temperature. In the embodiment shown, the strain gauges 30a-30d of the type ECF-350-3HA-a-(11)-O-SP from BCM Sensor Technologies with a size of 9.4×6.7 millimetres were glued with a positive fit on the surface 90 with UHU Plus 300 at 75° C. In a clamped state of the swing clamp 12a, the surface 90 is oriented parallel to the clamping force F, so that the neutral axis N, which extends in one plane of the surface 90, is perpendicular to F. Printed conductors 92a, 92d of the strain gauges 30a, 30d extend at a 45° angle to the neutral axis N, whereas printed conductors 92b, 92c of the strain gauges 30b, 30c extend at an angle of −45° to the neutral axis N. Seen in top view of the side surface 90, the angle is measured anticlockwise starting from the neutral axis N. The neutral axis N extends parallel to the longitudinal axis L of the clamp 11a. The resistances R1, R2, R3 or R4 then correspond to the strain gauges 30a, 30b, 30c or 30d. In the clamped state, a part 93a of the clamp 11a, which points in the direction of the force F, and therefore a surface segment 94a of the side surface 90 is extended, whereas a further part 93b of the clamp 11a, which points against the direction of the force F, and therefore a surface segment 94b of the side surface 90 is contracted. The associated printed conductors 92a, 92d or 92d, 92c are thus also extended or contracted. This deformation is represented for the unilaterally clamped beam shown in FIG. 7. FIG. 10 shows the change in resistance of the resistances R1-R4 (y-axis 96a-96d in units of ohms) as a function of the clamping force (x-axis 98a-98d in units of newtons). The resistances R1, R4 (curves 100a, 100d) decrease in the clamping operation, whereas the resistances R2, R3 (curves 100b, 100c) increase. An absolute change in resistance of the resistances R1-R4 is in each case 0.05 ohm.

Figure 11:
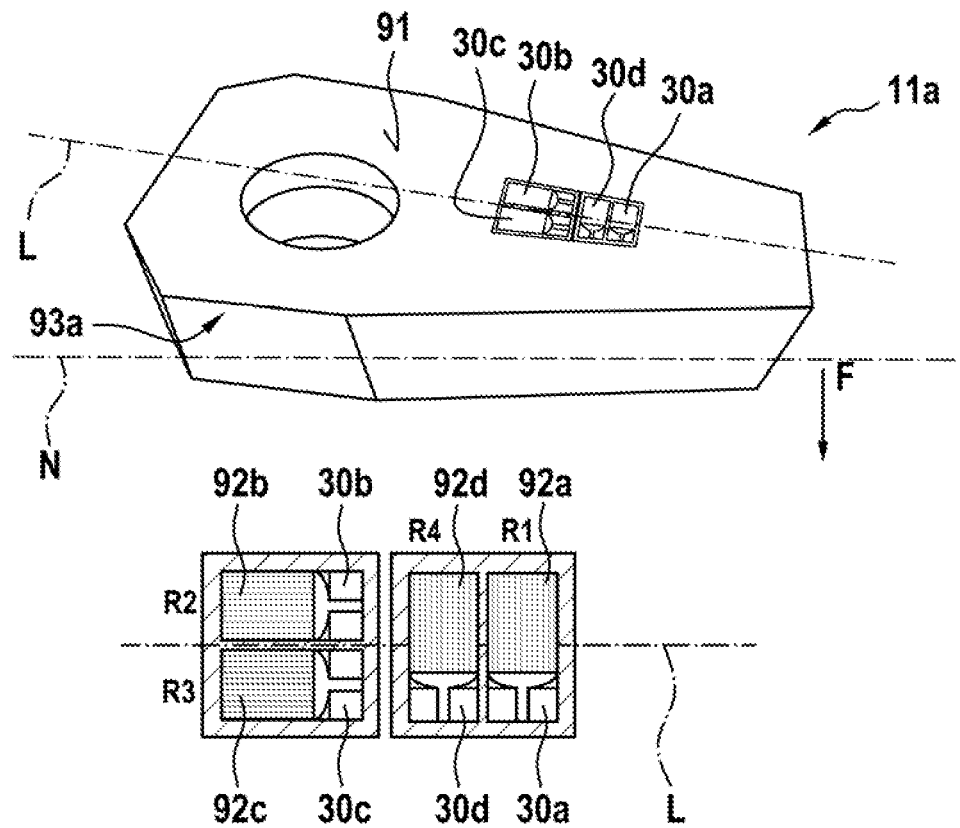
FIG. 11 a further assembly of the four strain gauges on the clamp in FIG. 2.
Figure 12:
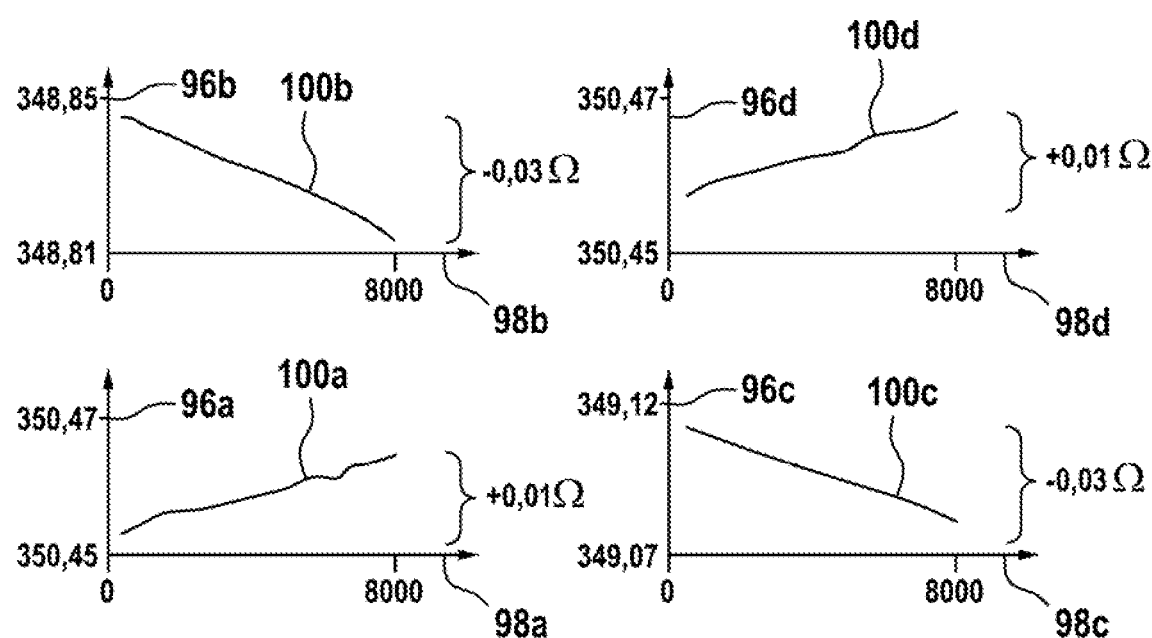
FIG. 12 schematic diagrams that show the resistances of the strain gauges in FIG. 11 varying under the clamping force.

In another arrangement of the strain gauges 30a-30d shown in FIG. 11, these are applied on a surface 91 of the clamp 12b that extends perpendicularly to the clamping force F, with a positive fit by means of adhesive at elevated temperature. In the embodiment shown, the strain gauges 30a-30d of the type ECF-350-3FB-(11)-O-SP from BCM Sensor Technologies with a size of 7.4×7.2 millimetres are glued with a positive fit on the surface 91 with UHU Plus 300 at 75° C. In other words printed conductors 92a-92d of the strain gauges 30a-30d, in a clamped state of the clamp 11a, extend on a top surface 91 of the clamp 11a and therefore in one plane, which extends perpendicularly to the clamping force F. Moreover, in each case the printed conductors 92a, 92d of the strain gauges 30a, 30d are arranged parallel to each other and the printed conductors 92b, 92c of the strain gauges 30b, 30c are arranged parallel to each other. Furthermore, the printed conductors 92b, 92c of the strain gauges 30b, 30c are arranged rotated by 90° to the printed conductors 92a, 92d of the strain gauges 30a, 30d. An upper part 93a of the clamp 11a can contract under the clamping force F, so that the surface 91 can be made smaller overall under the clamping force. The surface 91 becomes smaller (contracts) along the longitudinal axis L, whereas the surface 91 perpendicular to the longitudinal axis L of the clamp 11a becomes slightly larger (extends). A resistance change is produced for each resistance R1-R4 of the strain gauges 30a-30d. FIG. 12 shows this change in resistance of the resistances R1-R4 (y-axis 96a-96d in units of ohms) as a function of the clamping force F (x-axis 98a-98d in units of newtons). The resistances R1 and R4 increase by 0.01 ohm, as the small elongation of the surface 91 occurs. In contrast, the resistances R2, R3 decrease by 0.03 ohm, as the surface 91 becomes smaller along the longitudinal axis L to a greater extent than perpendicular to the longitudinal axis L.

The invention claimed is:

1. Sensor device (16a-16d) for monitoring a clamping force (F) exerted by a clamping element (11a-11d) of a clamping device (12a-12d) on a component (14), said device comprising:
at least one strain gauge (30a-30d), which can be arranged on a surface (90, 91) of the clamping element (11a-11d) of the clamping device (12a-12d) and is deformable under the clamping force (F),
a transmission module unit (36) based on electromagnetic transmission technology connected to the at least one strain gauge (30a-30d), for detecting a voltage (U5) that is indicative of a deformation (f) of the at least one strain gauge (30a-30d),
an antenna element (38) connected to the transmission module unit (36) for transmitting a signal that is indicative of the detected voltage (U5), and for receiving electromagnetic energy for electrical supply of the transmission module unit (36) and at least one strain gauge (30a-30d), and
a radio-frequency identification write/read head device (18a, 18b) for receiving the signal from the antenna element (38) of the at least one sensor device (16a-16d) and for transmitting electromagnetic energy to supply the sensor device (16a-16d).

2. The sensor device (16a-16d) according to claim 1, wherein the sensor device (16a-16d) has at least two strain gauges (30a-30d), which can be arranged on the surface (90, 91) of the clamping element (12a-12d) and are deformable under the clamping force (F).

3. The sensor device according to claim 1, wherein the sensor device (16a-16d) has four strain gauges (30a-30d), which can be arranged on the surface (90, 91) of the clamping element (11a-11d) and are deformable under the clamping force (F), wherein the four strain gauges (30a-30d) are connected together electrically in such a way that the four strain gauges (30a-30d) form a bridge circuit (44).

4. The sensor device (16a-16d) according to claim 3, wherein the four strain gauges (30a-30d) can be arranged on the surface (90) of the clamping element (11a-11d) in such a way that the surface (90) extends parallel to the clamping force (F), wherein two strain gauges (30a, 30d) of the four strain gauges (30a-30d) can be arranged in such a way that printed conductors (92a, 92d) of the two strain gauges (30a, 30d) extend over a surface segment (94a) of the surface (90) that can become larger under the clamping force (F), and wherein the other two strain gauges (30b, 30c) of the four strain gauges (30a-30d) can be arranged in such a way that printed conductors (92b, 92c) of the other two strain gauges (30b, 30c) extend over a surface segment (94b) of the surface (90) that becomes smaller under the clamping force (F).

5. The sensor device according to claim 4, wherein the printed conductors (92a, 92d) of the two strain gauges (30a, 30d) extend at an angle of 45° to a perpendicular line (N) to the clamping force (F) and the printed conductors (92b, 92c) of the other two strain gauges (30b, 30c) extend at an angle of −45° to a perpendicular line (N) to the clamping force (F).

6. The sensor device according to claim 3, wherein the four strain gauges (30a-30d) can be arranged on the surface (91) of the clamping element (11a-11d) in such a way that the surface (91) points against the clamping force (F) and extends perpendicularly to the clamping force (F), printed conductors (92a-92d) of the four strain gauges (30a-30d) extend along the surface (91) and the printed conductors (92a, 92d; 92b, 92d) of in each case two strain gauges (30a, 30d; 30b, 30c) extend parallel to each other, wherein two strain gauges (30a, 30d) of the four strain gauges (30a-30d) can be arranged in such a way that the printed conductors (92 a, 92d) of the two strain gauges (30a, 30d) extend parallel to a longitudinal axis (L) of the clamping element (11a-11d), and wherein the other two strain gauges (30b, 30b) of the four strain gauges (30a-30d) can be arranged in such a way that the printed conductors (92b, 92c) of the other two strain gauges (30b, 30c) extend perpendicularly to the longitudinal axis (L) of the clamping element (11a-11d).

7. The sensor device (16a-16d) according to claim 1, wherein the sensor device (16a-16d) has an amplifier (32), which is connected to the at least one strain gauge (30a-30d) and the transmission module unit (36), wherein the amplifier (32) is configured to amplify a voltage (U5) produced by the deformation (f) of the at least one strain gauge (30a-30d) and output the amplified voltage (U5) to the transmission module unit (36).

8. The sensor device (16a-16d) according to claim 1, wherein the transmission technology is radio-frequency identification or a proprietary transmission technology.

9. The sensor device (16a-16d) according to claim 1, wherein the clamping device (12a-12d) is configured as a swing clamp (12a-12d) and the clamping element (11a-11d) is configured as a clamp (11a-11d) or wherein the clamping device (12a-12d) is configured as a gripper and the clamping element (11a-11d) is configured as a toe dog.

10. Method for monitoring a clamping force (F) exerted by a clamping element (11a-11d) of a clamping device (12a-12d) on a component (14), the method comprising the steps:
   receiving (S2) electromagnetic energy for electrical supply of a transmission module unit based on electromagnetic transmission technology (36) from a radio-frequency identification write/read head device (18a, 18b) and at least one strain gauge (30a-30d) by means of an antenna element (38) connected to the transmission module unit (36), wherein the at least one strain gauge (30a-30d) is arranged on a surface (90, 91) of the clamping element (11a-11d),
   detecting (S4) a voltage (U5) by the transmission module unit (36) connected to the at least one strain gauge (30a-30d), wherein the voltage (U5) is indicative of a deformation (f) of the at least one strain gauge (30a-30d) under the clamping force (F), and
   transmitting (S6) a signal that is indicative of the detected voltage (U5), by means of the antenna element (38)) to the radio-frequency identification write/read head device (18a, 18b).

11. The method according to claim 10, comprising the further steps:
   detecting (S4) a feed voltage (U0) applied on the at least one strain gauge (30a-30d) and,
   determining (S8) the clamping force (F) from the feed voltage (U0) applied on the at least one strain gauge (30a-30d) and the voltage (U5) that is indicative of the deformation (f).

12. The method according to claim 11, wherein a measurement relationship between the voltage (U0, U5) and the clamping force (F) is used in the determination (S8).

13. The method according to claim 10, including a program for data processing equipment configured for executing steps of the method when the method is carried out by the data processing equipment.

14. The method according to claim 13 further including a machine-readable storage medium on which the program is stored.

* * * * *